United States Patent
Kempf et al.

(10) Patent No.: US 7,399,247 B2
(45) Date of Patent: Jul. 15, 2008

(54) SUN GEAR BUSHING AND SLEEVE AND METHOD FOR SEALING IN A HYBRID ELECTROMECHANICAL AUTOMATIC TRANSMISSION

(75) Inventors: Gregory W. Kempf, Avon, IN (US); James A. Raszkowski, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 78 days.

(21) Appl. No.: 11/019,061

(22) Filed: Dec. 21, 2004

(65) Prior Publication Data

US 2005/0209038 A1     Sep. 22, 2005

Related U.S. Application Data

(60) Provisional application No. 60/555,141, filed on Mar. 22, 2004.

(51) Int. Cl.
*F16H 57/04* (2006.01)

(52) U.S. Cl. ............... 475/159; 475/331; 184/6.12

(58) Field of Classification Search ............... 475/159, 475/331, 5, 346, 347; 74/467, 468, 461 R; 184/6.12; 277/585; 403/1, 30; 903/909–911
See application file for complete search history.

(56) References Cited

U.S. PATENT DOCUMENTS

| | | | | |
|---|---|---|---|---|
| 2,590,761 A | * | 3/1952 | Edgar | 384/278 |
| 2,859,986 A | * | 11/1958 | Josephson | 277/585 |
| 3,053,115 A | * | 9/1962 | Cartwright et al. | 475/159 |
| 4,438,663 A | * | 3/1984 | Eichenberger et al. | 475/283 |
| 4,449,424 A | * | 5/1984 | Hauser | 475/206 |
| 4,748,862 A | * | 6/1988 | Johnston | 74/7 R |
| 4,913,563 A | * | 4/1990 | Veronesi et al. | 384/312 |
| 5,188,575 A | * | 2/1993 | Leising et al. | 475/280 |
| 5,609,538 A | * | 3/1997 | Nogle et al. | 475/159 |
| 5,988,614 A | * | 11/1999 | Sturmon | 267/292 |
| 6,022,287 A | * | 2/2000 | Klemen et al. | 475/5 |
| 6,645,111 B2 | * | 11/2003 | Ohkubo et al. | 475/210 |
| 6,758,786 B2 | * | 7/2004 | Lepelletier | 475/296 |
| 2002/0115518 A1 | * | 8/2002 | Strowik et al. | 475/178 |

* cited by examiner

*Primary Examiner*—Tisha D Lewis

(57) ABSTRACT

The present invention details a sleeve and bushing of an electromechanical automatic planetary transmission. The sleeve and bushing operate to confine the desired flow of transmission lubricant through the components of the planetary gear arrangement. Additionally, the sleeve and bushing assist in maintaining a sufficient pressure level in the cavity of the planetary carrier to enable the lubricant to reach the bearings of the pinion gear. Moreover, the radius or size of the bushing/sleeve arrangement can be adjusted to occupy the radial clearance or cavity between the sun gear and main shaft for an automatic transmission with axially separable splined sun gear and sun gear shaft.

15 Claims, 2 Drawing Sheets

SUN GEAR BUSHING AND SLEEVE AND METHOD FOR SEALING IN A HYBRID ELECTROMECHANICAL AUTOMATIC TRANSMISSION

CROSS-REFERENCE TO RELATED APPLICATIONS

This application claims the benefit of U.S. Provisional Application 60/555,141 filed Mar. 22, 2004.

TECHNICAL FIELD

This invention relates to a hybrid electromechanical automatic planetary transmission having a main shaft, sun gear and bushing-sleeve arrangement located between the main shaft and sun gear.

BACKGROUND OF THE INVENTION

The planetary gear arrangement of an automatic transmission allows the transmission to reduce or enhance the input speed received from the power source. The planetary gear arrangement's components include a ring gear, planetary carrier with at least one pinion gear, and a sun gear. The gears of the planetary gear arrangement encircle the main shaft of the transmission and through engagement with a series of clutches influence the output speed of the main shaft.

Given their essential functionality, planetary gear arrangements are often analyzed for improvements to their manufacturing processes and overall costs. The sun gear, for example, can be separated from its shaft to simplify the manufacturing process for each respective member. Such an alteration can create new demands on neighboring components within the planetary gear arrangement.

Optimizing the fuel economy and ensuring proper cooling of all the internal components in the hybrid transmission can also be critical. Planetary components can also assist in directing the flow of a lubricant to transmission components thereby reducing fatigue and increasing the transmission's lifecycle.

An electromechanical transmission is described U.S. Provisional Application Ser. No. 60/531,528, entitled "Two-Mode Compound-Split, Hybrid Electro-Mechanical Transmission Having Four Fixed Ratios," Schmidt et al., filed Dec. 19, 2003, assigned to General Motors Corporation and hereby incorporated by reference in its entirety.

SUMMARY OF THE INVENTION

The present invention provides a compact electromechanical transmission with a sleeve and sun gear bushing arrangement which encircles the main shaft of the transmission in a cavity formed between the sun gear and main shaft. Several advantages result from providing the bushing-sleeve arrangement disclosed herein including, (1) enabling a more efficient and cost effective internal spline cutting processes for the sun gear and (2) enabling the desired pressure level inside the planetary carrier compartment by sealing lube oil along the main shaft in order to support lubricant flow. In addition, the invention maintains the desired package space, ease of assembly, and part commonality.

In one aspect of the present invention, the bushing and sleeve provide some radial support to the sun gear, which encircles the bushing-sleeve arrangement and the main shaft.

In another aspect of the invention, the sun gear contains two axially separable members that are in a drivable relationship (the sun gear member and sun gear shaft member). The size of the bushing-sleeve arrangement is alterable to accommodate the increased radial space required by the axially separable sun gear members and their connecting splines. In this embodiment the bushing-sleeve arrangement also serves to reduce the size of a step located on the main shaft between two areas of the main shaft that are of different radial dimensions and thus reduces the stress concentrations at that point. Reduction in the size of the step on the main shaft significantly enhances the lifecycle of the main shaft.

In another aspect of the invention, the sleeve is press-fit into the sun gear to form a bore of predetermined size and diameter to receive the bushing which provides sealing for the cavity between the sun gear and main shaft.

More particularly, a radially compact journal oil seal is provided. The seal is in the lube system for the planetary gear arrangement of an automatic transmission and is designed to minimize leakage of lube oil to areas where it is not needed. The planetary gear arrangement includes a relatively rotatable main shaft and sun gear shaft wherein the sun gear member has broachable splines interconnectable with complementary splines on the sun gear member. The two sun gear members are axially separable from one another. The sun gear member has a journal bore formed larger than the root diameter of the internal spline on the sun gear member. The planetary gear arrangement also includes a sleeve press-fit into the journal bore of the sun gear member. The sleeve defines a bushing bore of a predetermined size. A bushing in the bushing bore sufficiently fills the remaining space in the cavity between the journal bore on the sun gear member and the main shaft, thereby acting as a seal for lube oil.

Additionally, the invention provides a method for substantially restricting the passage of oil away from a planetary gear arrangement. More specifically, the method includes: providing a main shaft and sun gear; sufficiently encircling the main shaft with the sun gear to form a cavity as a passage for lube oil; and fitting the main shaft with a sleeve and/or bushing sufficiently configured to fill the cavity and substantially prevent the passage of oil away from the planetary carrier.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
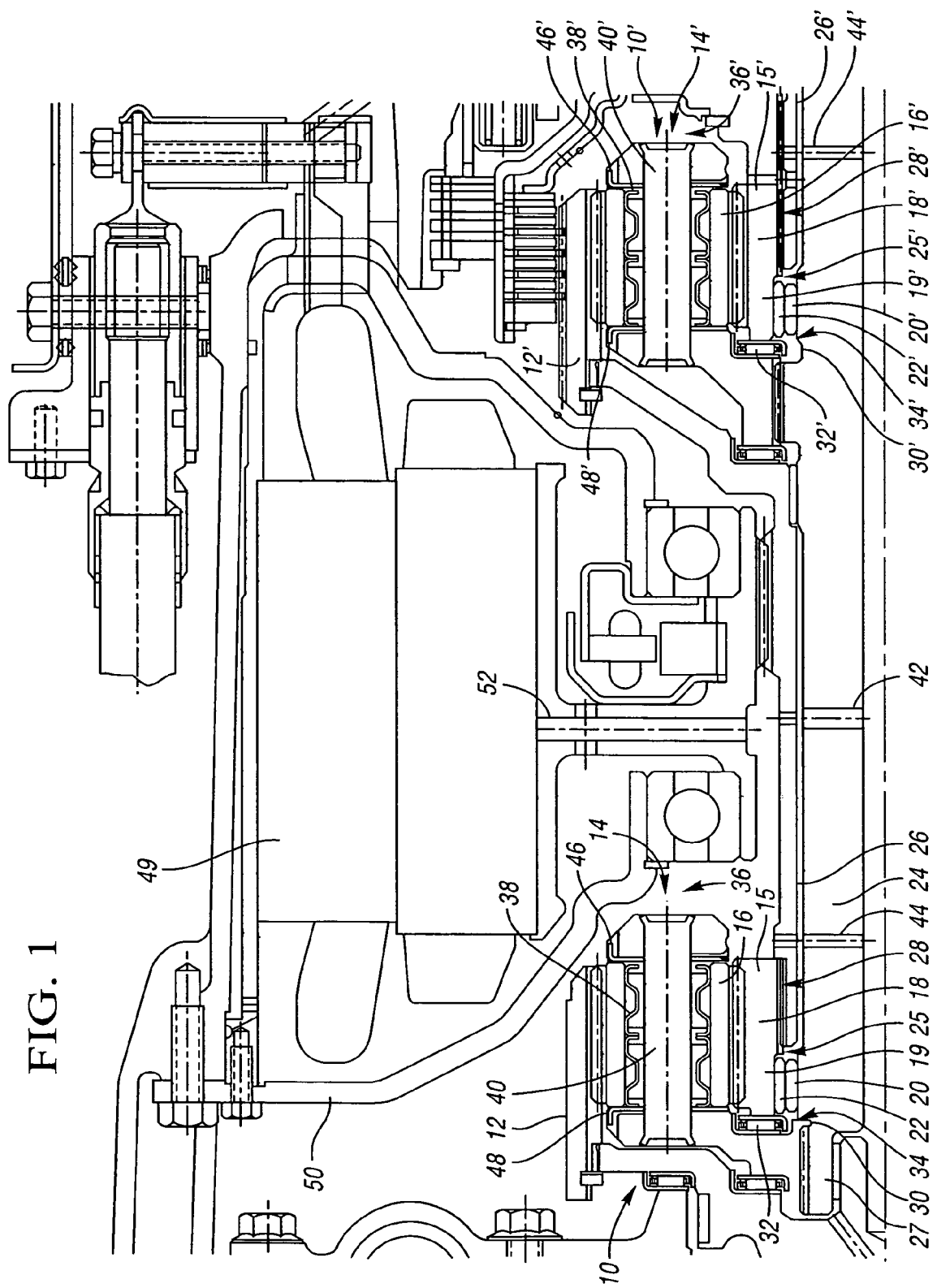
FIG. 1 is a fragmentary cross-sectional view of the planetary gear arrangement and electric motor taken along one side of the centerline of the front portion of an electro-mechanical transmission.

Referring to the drawings, there is seen in FIG. 1, two of three planetary gear arrangements (10, 10') in a hybrid electromechanical automatic transmission. Each planetary gear arrangement (10, 10') consist of three gear sets: the ring gear (12, 12'), the planetary carrier (14, 14') with at least one pinion gear (16, 16'), and the sun gear (18, 18'). Together, the three gear sets (12, 14 and 18 as well as 12', 14' and 18') enable the planetary gear arrangements (10, 10') to alter the output speed of the transmission.

Figure 2:
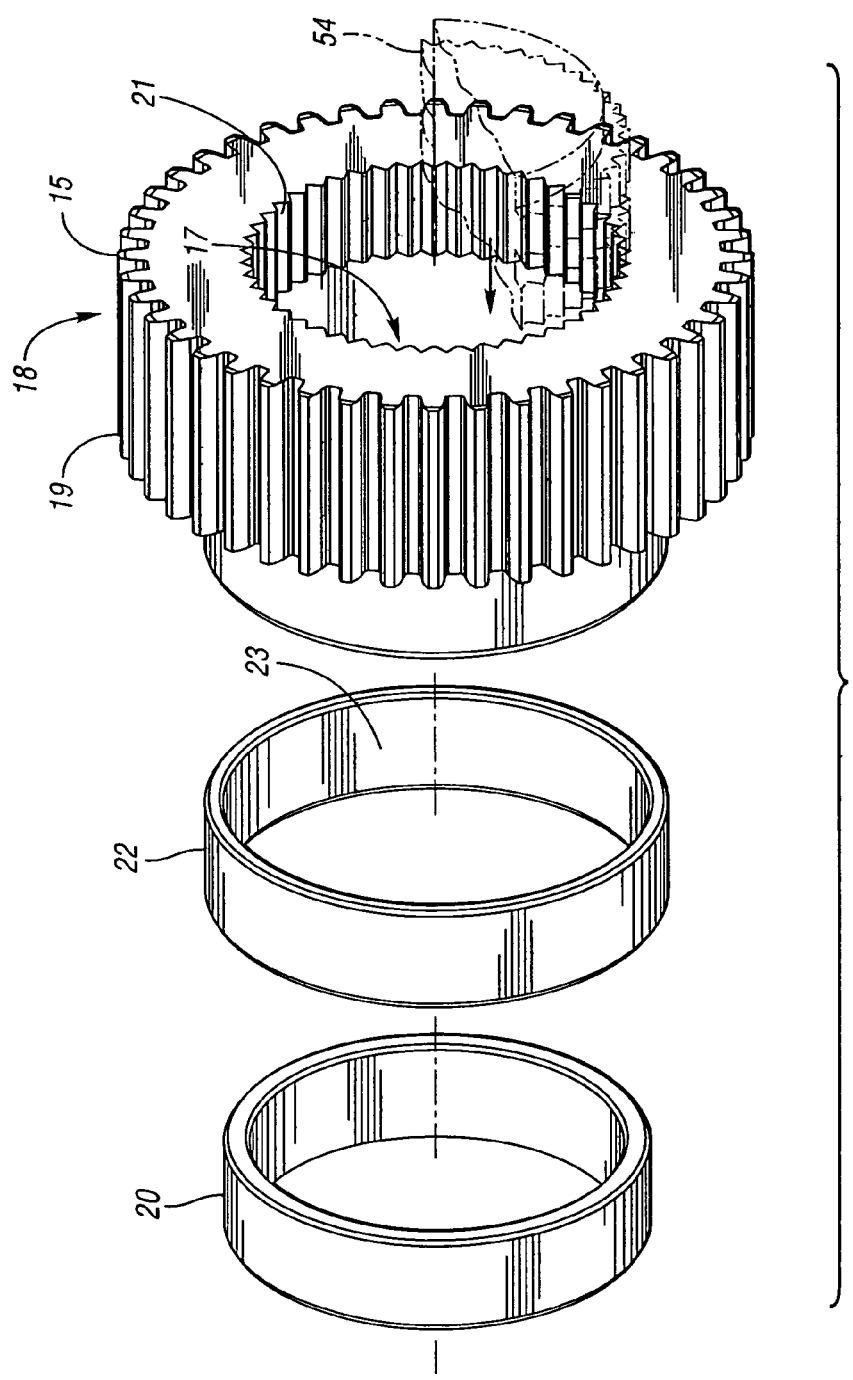
FIG. 2 is an exploded perspective view of a sun gear, sleeve and bushing arrangement for use between relatively rotatable shaft components of the transmission shown in FIG. 1.

Turning our attention to the first planetary gear arrangement 10, provided is a bushing 20 and steel sleeve 22 as shown exploded in FIG. 2. The bushing 20 and steel sleeve 22 are encircled by the sun gear 18 and encircle the main shaft 24 as shown in FIG. 1. The bushing-sleeve arrangement (20, 22) provides several technical advantages to the transmission. One technical benefit of the bushing-sleeve arrangement (20, 22) is that it enables the sun gear 18 and sun gear shaft 26 to be axially separable without substantial alteration to the remaining components of the planetary gear arrangement 10. There are several benefits that accompany separating the sun gear 18 from the sun gear shaft 26 including simplified manufacturing processes and reduced costs. For examples, see Non-Provisional Application entitled, "Splined Sun Gear and Method for Compact Electro-Mechanical Transmission," Ser. No. 11/013,647, G. Kempf, assigned to General Motors Corporation, and hereby incorporated by reference in its entirety. However, since the sun gear 18 and sun gear shaft 26 must be in a drivable relationship during operation of the transmission, they require a reliable connecting mechanism.

In the preferred embodiment, the sun gear 18 and sun gear shaft 24 are connected by a section of complementary splines 28 located between the sun gear 18 and sun gear shaft 26, as depicted in FIG. 1. The sun gear 18 has internal splines 21, shown in FIG. 2, that are connectable to the external splines (as a part of the complementary splines 28 shown in FIG. 1) on the sun gear shaft 26. These complementary splines 28 increase the radial span of the sun gear 18 and sun gear shaft 26 over the radial span of an integral sun gear and shaft to accommodate for the thickness of the splines. Therefore, the radial distance between the sun gear 18 and main shaft 24 (and thus the cavity 25 defined therebetween) is enlarged. In the preferred embodiment, the bushing-sleeve arrangement (20, 22) accommodates such increase by providing additional radial support to the sun gear 18. In this arrangement, shown in FIGS. 1 and 2, the sun gear 18 requires both a first bore 17 in a first axial portion 19 of the sun gear 18 and internal splines 21 in a second axial portion 15 of the sun gear 18. To enable the internal splines 21 to be broached, the first bore 17 is sufficiently larger than the root diameter of the internal splines 21 to accommodate the reciprocations of the broaching device 54 (shown in phantom) during the broaching process.

Another technical advantage of the present invention is that it does not require the main shaft 24 to have a larger radial span in the area of the main shaft 24 that is adjacent to the first axial portion 19 of the sun gear 18, as shown in FIGS. 1 and 2. A journal portion 27 of the main shaft 24 is narrower or thinner at 30 where the main shaft 24 is adjacent to a thrust bearing 32. The narrower journal portion 27 of the main shaft 30 provides clearance between the thrust bearing 32 and main shaft 24 during operation of the transmission. The radial variance between the journal portion 27 and the area of the main shaft 24 that is adjacent to the first axial portion 19 of the sun gear 18 creates a radius-formed step 34. If too steep, the lifecycle of the radius-formed step 34 can be drastically reduced causing the entire transmission to fail prematurely. However, if the size of the radius-formed step 34 is minimized, the lifecycle of the main shaft 24 is preserved. Therefore, the bushing-sleeve arrangement (20, 22) further allows the radius-formed step 34 of the main shaft 24 to maintain the predetermined appropriate size to achieve its desired fatigue life requirements.

An additional technical advantage of the present invention is that it enables the transmission lubrication material or oil (not shown) to lube transmission components by sustaining the necessary pressure level throughout the planetary carrier compartment 36. FIG. 1 shows the pinion bearings 38 of the pinion gear 16 which are of particular concern because they experience high temperatures while providing support to the pinion gears 16. The pinion bearings 38 are not easily accessible from the outer surface of the planetary carrier 14; therefore, the lubricant must stay pressurized beyond a certain threshold to reach the spindle 40 of the pinion gear 16, which is adjacent to the pinion bearings 38.

First, as shown in FIG. 1, the lubricant (not shown) flows from the main shaft 24 through several apertures like (42 and 44) to either the electric motor 44 and housing 50 through a housing aperture 52 or the sun gear shaft 26. The bushing-sleeve arrangement (20,22) substantially prevents the lubricant from flowing between the sun gear 18 and main shaft 24, thereby helping to maintain the pressure inside the planetary carrier compartment 36. The oil that travels through the first aperture 42 primarily travels to the electric motor housing 50, while the oil that travels through the second aperture 44 primary travels to the planetary gear arrangement 10. The oil that travels through the second aperture 44 is restricted from going elsewhere so that the lubricant caresses the pinion gears 16 of the planetary carrier 14 and is directed towards the spindle 40 of the pinion gear 16 by a first thrust washer 46. The lubricant then travels along the spindle 40 of the pinion gear 16 to a second thrust washer 48, which carries the lubricant away from the planetary carrier 14. Without the bushing-sleeve arrangement (20, 22), the lubricant would flow into unintended areas of the transmission and would not sufficiency reach the pinion bearings 38 of the pinion gear 16. A similar flow pattern occurs with the second planetary gear arrangement 10' and its components (12', 16', 15', 18', 20', 22', 25', 26', 28' 30', 32', 34', 36', 38', 46', and 48'). A more detailed description of the lubricant flow path is in Non-Provisional Application entitled "Lubrication System for Hybrid Electro-Mechanical Transmission Components," Ser. No. 11/035,344, G. Kempf, assigned to General Motors Corporation, and hereby incorporated by reference in its entirety.

An additional technical advantage of the present invention is that it enables a more simplified assembly sequence for the transmission. The bushing-sleeve arrangement (20, 22) enabled the main shaft 24 journal diameter, shown in FIG. 1, to remain small enough so that the sun gear shaft 26, motor assembly (49,50) and first planetary gear arrangement 10 could be assembled after the main shaft 24 was already in place. The bushing-sleeve arrangement (20,22) fills and seals the cavity 25 between the main shaft 24 and sun gear 18. Persons of ordinary skill in the art should know; however, that the radial clearance or cavity 25 between the sun gear 18 and main shaft 24 may also be filled by alternative means such as using a larger bushing or sleeve member if available.

Figure 3:
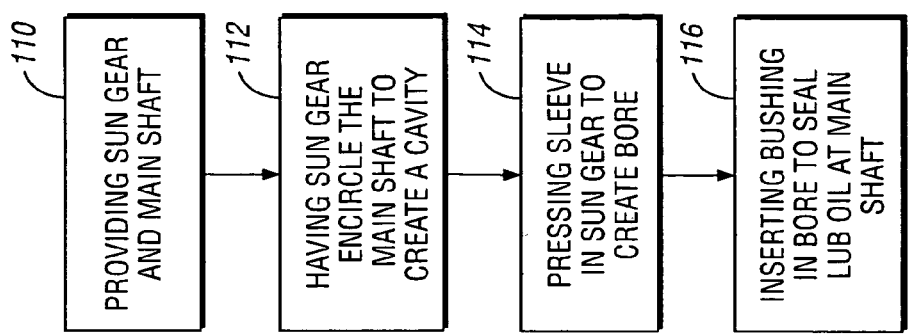
FIG. 3 is a block diagram of a method for substantially restricting the passage of oil from a planetary gear arrangement.

Lastly, a method for assembling a planetary gear arrangement 10 or 10' with a bushing 20 and sleeve 22 is provided and outlined in FIG. 3. The method includes providing a sun gear and main shaft at 110 for the planetary gear arrangement of an automatic planetary transmission, then having the sun gear at 112 encircle the main shaft of the planetary gear arrangement to create a cavity 25 (shown in FIG. 1) between the sun gear 18 and main shaft 24. The cavity 25 is then filled, at step 116, by the bushing-sleeve arrangement 20, 22.

In one embodiment, the method includes providing a sun gear and sun gear shaft which are axially separable and connectable by complementary splines such as 21. As previously mentioned, the sun gear involves a first bore 17 of predetermined size to accommodate broaching of the internal splines 21, which were not needed with an integral sun gear and sun gear shaft. In this instance, the sun gear 18 is broached to form the internal splines 21 and the sun gear 18 thus needs the first bore 17 larger than the root diameter of the sun gear splines 21 to clear for movement of the broaching tool. The sleeve 22 is then press-fit into the first axial portion 19 of the sun gear 18 to form a second bore for receiving the bushing 20. The inner diameter of the sleeve forms the second bore 23. The bushing 20 is then inserted into the second bore 23 to sufficiently fill the remainder of the cavity 25 (shown in FIG. 1) to sufficiently prevent the passage of oil from the cavity 25 so that the oil is available for the planetary carrier 14.

While the best modes for carrying out the invention have been described in detail, those familiar with the art to which this invention relates will recognize various alternative designs and embodiments for practicing the invention within the scope of the appended claims.

The invention claimed is:

1. A planetary gear arrangement of an automatic transmission, comprising:
   a main shaft;
   a sun gear encircling said main shaft;
   wherein said sun gear and main shaft are configured to define a first cavity;
   a sleeve encircling said main shaft and encircled by said sun gear, an inner diameter of the sleeve and main shaft defining a second cavity therebetween;
   a bushing removably received into the second cavity;
   wherein said bushing and sleeve are sufficiently configured to fill said first cavity between said main shaft and said sun gear to substantially prevent the passage of oil through said first cavity and said second cavity when said bushing is not removed so that oil is available for the planetary gear arrangement; and
   wherein said bushing and sleeve are further operative to provide radial support between said sun gear and said main shaft.

2. The automatic transmission of claim 1, further including:
   an electric motor drivenly coupled to a sun gear shaft, said sun gear shaft axially separable from said sun gear;
   a housing encasing said electric motor and adapted to confine said oil; and
   wherein said bushing and said sleeve substantially prevent the passage of said oil from said housing.

3. The automatic transmission of claim 1, including a sun gear shaft wherein said sun gear is in drivable relationship with and axially separable from said sun gear shaft.

4. The automatic transmission of claim 1, including a sun gear shaft wherein said sun gear and sun gear shaft have complementary splines to enable said sun gear to be axially separable from said sun gear shaft.

5. The automatic transmission of claim 1, wherein said main shaft has at least one variation in the radius of said main shaft forming a radius-formed step near said cavity;
   wherein a predetermined lifecycle of said main shaft decreases upon increases in the size of said radius-formed step; and
   wherein said bushing and sleeve are radially sufficiently large enough near said radius-formed step to sufficiently reduce said radius-formed step to obtain said predetermined lifecycle of said main shaft.

6. A method for substantially preventing the passage of oil from a planetary gear arrangement, comprising:
   providing a main shaft and sun gear;
   sufficiently encircling said main shaft with said sun gear to define a cavity as a passage for the oil;
   interposing a sleeve into the cavity between said main shaft and said sun gear, said sleeve sized to sufficiently prevent the passage of oil between said sleeve and said sun gear, an inner diameter of said sleeve and said main shaft defining a second cavity for the passage of oil;
   removably filling said second cavity with a bushing sufficiently sized and configured between said main shaft and said sleeve to sufficiently prevent the passage of oil through said second cavity when said bushing is not removed so that the oil is available for the planetary gear arrangement; and
   providing radial support to said sun gear through said bushing.

7. The method of claim 6, including driving said sun gear by an axially separable sun gear shaft.

8. The method of claim 7, including connecting said sun gear and sun gear shaft by an internal spline on one axial portion of said sun gear.

9. The method of claim 8, including broaching said internal spline on said sun gear.

10. A method for substantially preventing the passage of oil from a planetary gear arrangement, comprising:
    providing a main shaft and sun gear;
    sufficiently encircling said main shaft with said sun gear to define a cavity as a passage for the oil;
    interposing a sleeve into the cavity between said main shaft and said sun gear, said sleeve sized to sufficiently prevent the passage of oil between said sleeve and said sun gear, said sleeve and said main shaft defining a second cavity for the passage of oil;
    filling said second cavity with a bushing sufficiently sized and configured between said main shaft and said sleeve to sufficiently prevent the passage of oil through said second cavity so that the oil is available for the planetary gear arrangement;
    driving said sun gear by an axially separable sun gear shaft;
    connecting said sun gear and a sun gear shaft by an internal spline on one axial portion of said sun gear;
    broaching said internal spline on said sun gear; and
    providing a first bore on another axial portion of said sun gear larger than the root diameter of said internal spline on said sun gear before broaching said spline on said sun gear.

11. The method of claim 10, including pressing one of said sleeve and/or bushing into said first bore in said sun gear to create a second bore for the other of said sleeve and/or bushing.

12. A radially compact journal oil seal and drive arrangement for the planetary gear arrangement of an automatic transmission comprising,
    relatively rotatable main shaft and sun gear shaft;
    a sun gear having a broachable internal spline interconnectable with said sun gear shaft and axially separable therefrom;
    said sun gear having a first bore at least partially forming a cavity between said main shaft and said sun gear and formed sufficiently larger than the root diameter of said internal spline when said internal spline is being broached;
    a sleeve press-fit into said first bore of said sun gear to partially fill said cavity and defining a second bore of a predetermined size; and
    a bushing in said second bore sufficiently filling the remaining cavity between said sun gear and said main shaft to act as a seal for oil in said space.

13. A sun gear assembly for a planetary arrangement of an automatic transmission, comprising:
  a sun gear having first and second axial portions;
  wherein said first axial portion of said sun gear defines a first bore;
  a relatively rotatable main shaft and sun gear shaft, said main shaft received into the first bore;
  wherein said second axial portion of said sun gear has an internal spline interconnectable with said sun gear shaft and axially separable therefrom;
  a steel sleeve sufficiently press-fittable into said first bore of said first axial portion of said sun gear to prevent passage of oil between said steel sleeve and said sun gear; and
  a bushing insertable into a second bore defined by said steel sleeve and said main shaft;
  wherein said bushing and sleeve are further operative to provide radial support between said sun gear and said main shaft and sufficiently configured to fill said first bore and said second bore when the bushing is inserted to substantially prevent the passage of oil through said first bore and said second bore so that oil is available for the planetary arrangement.

14. The sun gear assembly of claim 13, wherein said steel sleeve is precision ground to within predetermined inner diameter and outer diameter tolerances and surface finish requirements.

15. The sun gear assembly of claim 13, wherein said steel sleeve is chamferable.

* * * * *